United States Patent [19]
Whitlock

[11] 3,756,097
[45] Sept. 4, 1973

[54] TIRE CHAIN APPLYING DEVICE

[76] Inventor: Leslie A. Whitlock, Box 1667, Modesto, Calif. 95354

[22] Filed: Apr. 29, 1971

[21] Appl. No.: 138,615

[52] U.S. Cl. .................................................. 81/15.8
[51] Int. Cl. ............................................ B60c 27/06
[58] Field of Search ........................ 81/15.8; 254/88

[56] References Cited
UNITED STATES PATENTS

| 2,022,804 | 12/1935 | Garey | 254/88 |
| 1,189,632 | 7/1916 | Seitz | 81/15.8 UX |
| 2,532,149 | 11/1950 | Cone | 254/88 |

FOREIGN PATENTS OR APPLICATIONS

| 939,623 | 4/1948 | France | 254/88 |

OTHER PUBLICATIONS
Popular Mechanics, Sept. 1941, page 159

*Primary Examiner*—James L. Jones, Jr.
*Attorney*—John N. Randolph

[57] ABSTRACT

An elongated pad having transverse rows of upstanding bosses or studs for supporting a pneumatic tire of a vehicle wheel and accommodating certain of the cross chains of a tire chain between certain of the rows of bosses. The rows of bosses being spaced apart sufficiently so that the cross chains can move lengthwise of the pad for properly adjusting and tightening the tire chain around the tire. The device is formed of a material impervious to fluids and the studs are hollow and open through the underside of the pad to form suction cups, for securing the device to an ice covered surface or to provide chambers capable of being packed with snow to prevent slippage of the device on a snow covered surface.

3 Claims, 5 Drawing Figures

Patented Sept. 4, 1973 3,756,097
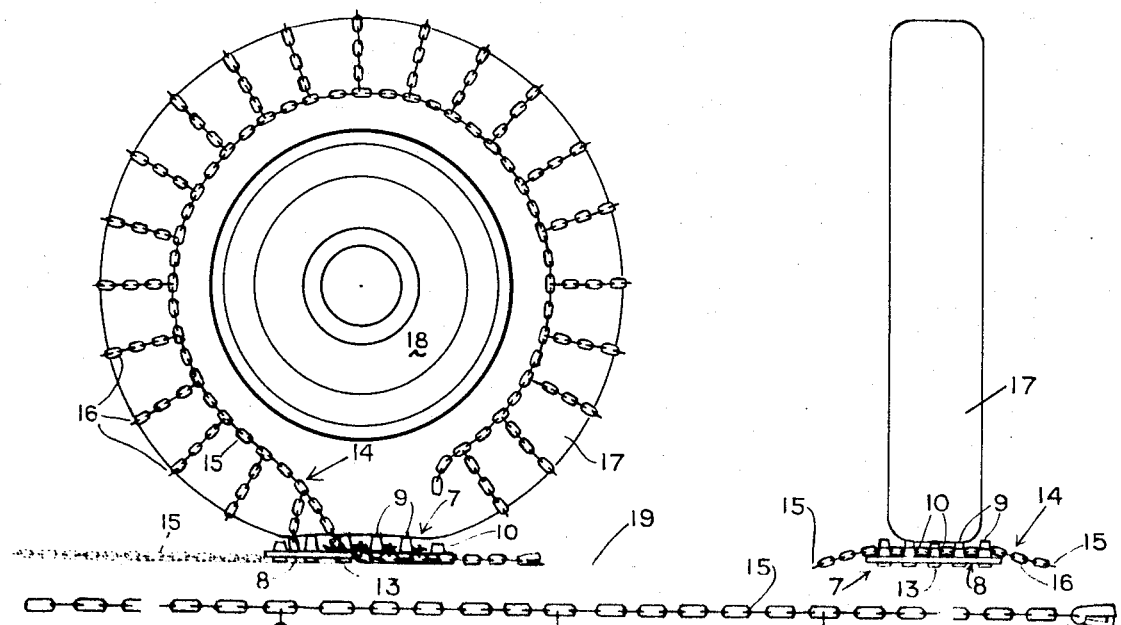
FIG. 1  FIG. 2
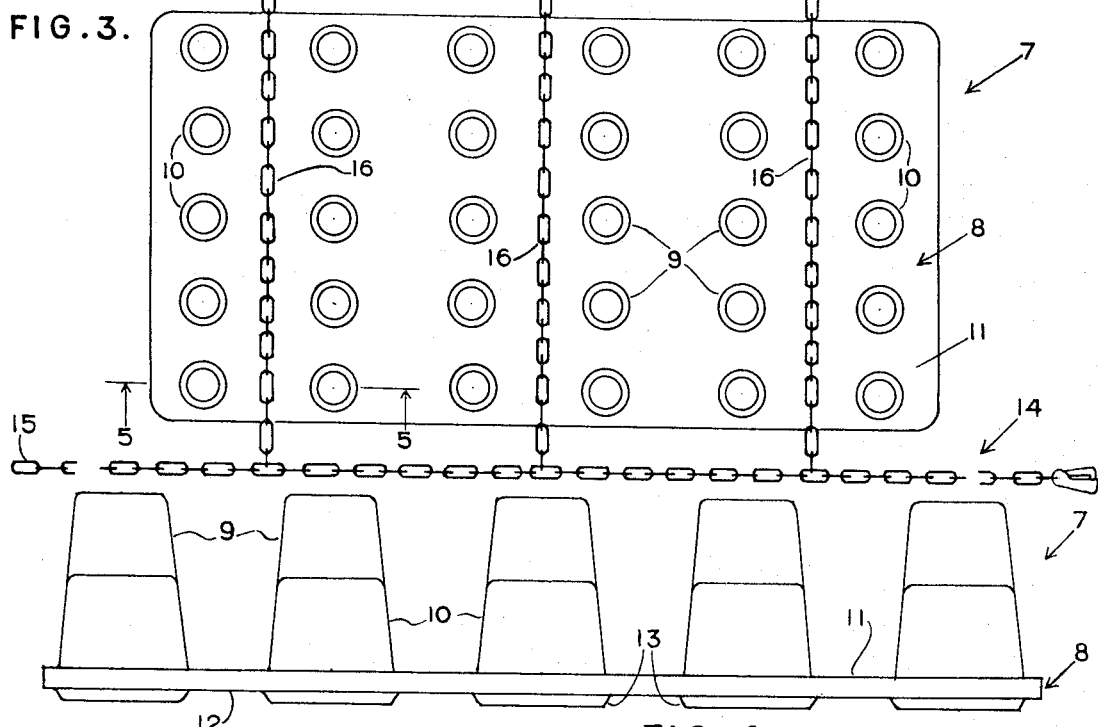
FIG. 3
FIG. 4
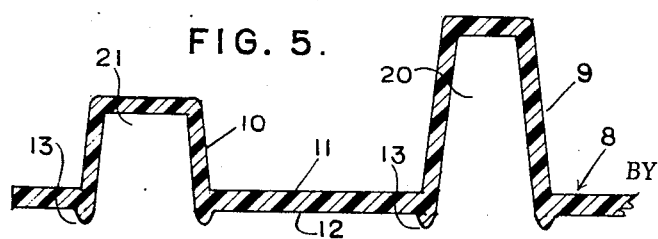
FIG. 5
INVENTOR
LESLIE A. WHITLOCK
John N. Randolph
BY ATTORNEY

TIRE CHAIN APPLYING DEVICE

SUMMARY

It is a primary object of the present invention to provide a tire chain applying device which will eliminate the dangers normally involved in applying tire chains, where it is necessary to utilize an axle or bumper jack with the risk of the jack slipping and releasing a vehicle wheel from a raised position.

Another object of the invention is to provide a device which is so constructed that the pneumatic tire of an automobile or truck wheel may be readily driven thereon and a tire chain applied thereto and properly tightened or adjusted.

A further object of the invention is to provide a device which will not slip as the vehicle tire is being driven thereon or therefrom and which will prevent slipping of the tire while in contact therewith.

Various other objects and advantages of the invention will hereinafter become more fully apparent from the following description of the drawing, illustrating a presently preferred embodiment thereof, and wherein:

BRIEF DESCRIPTION OF THE DRAWING

FIG. 1 is a side elevational view showing the tire chain applying device in use;

FIG. 2 is an end elevational view thereof;

FIG. 3 is an enlarged top plan view of the same;

FIG. 4 is an enlarged end elevational view of the device, and

FIG. 5 is an enlarged fragmentary longitudinal sectional view, taken substantially along a plane as indicated by the line 5—5 of FIG. 3.

DESCRIPTION OF THE PREFERRED EMBODIMENT

Referring more specifically to the drawing, the tire chain applying device in its entirety and comprising the invention is designated generally 7, and comprises an elongated mat 8 and a plurality of projections, such as the studs or bosses, 9 and 10 which are fixed to and rise from an upper surface 11 of the mat 8.

The mat 8 and bosses 9 and 10 preferably constitute an integral molded product formed of a material impervious to air and moisture, such as a plastic. The bosses 9 and 10 are disposed in approximately equally spaced apart relation to one another and in rows disposed crosswise of the mat 8, including, preferably, four intermediate transverse rows of bosses 9, and two rows of bosses 10 which are located adjacent the ends of the mat 8. The bosses 10 of the two end rows are approximately one-half the heighth of the bosses 9, as best illustrated in FIGS. 4 and 5.

As seen in FIG. 5, the studs or bosses 9 and 10 are hollow and open downwardly through the underside 12 of the mat 8. Said underside 12 is provided with an annular embossment 13 surrounding the open lower end of each boss or stud 9 and 10. Said ring portions 13 are of downwardly tapered or V-shaped cross section, as seen in FIG. 5.

The device 7 is placed on a substantially horizontal surface with the bosses 9 and 10 extending upwardly. The mat 8 is of a width less than the width of a conventional tire chain 14, so that portions of the two side chains 15 thereof can be positioned to straddle the mat 8 and with three adjacently disposed cross chains 16 of the tire chain extending between certain of the transverse rows of the bosses. As seen in FIG. 3, one cross chain 16 is disposed between the two middle rows of bosses 9 and the other two cross chains 16 are disposed between the end rows of bosses 10 and the transverse rows of bosses 9, located adjacent thereto.

The pneumatic tire 17 of a vehicle wheel 18 is then driven onto the device 7 from either end thereof. The end row of bosses 10, initially engaged by the tire 17 in moving onto the device 7, will function as a ramp to enable the tire tread to move more readily up and onto the higher or taller bosses 9. The bosses 9 and 10 are sufficiently rigid to support the tire 17, wheel 18 and that part of the weight of the vehicle normally borne by said tire and wheel; however, the bosses 9 and 10 will yield slightly under this load for a purpose that will hereinafter become apparent.

With the tire 17 resting on the bosses 9, or 9 and 10, the tire chain 14 is extended around the tire 17 and the ends thereof connected together in a conventional manner. The transverse rows of bosses 9 and 10 are spaced sufficiently apart, as seen in FIG. 3, so that the cross chains 16 which are disposed between the rows of bosses, can be moved lengthwise of the pad 8 for adjusting the chain 14 around the tire 17, for properly tightening the chain on the tire.

If the surface 19 on which the device 7 is positioned constitutes a snow covered surface, the downwardly opening chambers 20 and 21 of the bosses 9 and 10, respectively, will become packed with the snow as the mat 8 is forced downwardly by the weight of the tire 17 on the bosses 10 and thereafter on the bosses 9 for anchoring the device 7 to the snow covered surface 19 while the tire is being driven onto the bosses 10 and 9, supported thereby and thereafter driven therefrom. The embossed rings 13 will also function as treads for the underside 12 of the mat 8 to assist in preventing the mat from slipping relative to the surface 19.

If the surface 19 constitutes an icy surface, the chambers 20 and 21 will function as suction cups to adhere thereto as the bosses 10 and 9 are collapsed slightly by the weight of the tire 17 moving thereon and thereafter allowed to expand slightly as the weight is more evenly distributed over a greater number of the bosses, to create a partial vacuum or suction in said chambers 20 and 21. Additionally, the rings 13 will function as anti-slip tread elements.

Two of the devices 7 can be placed side by side for supporting the two tires, not shown, of a dual truck wheel for applying tire chains to such dual tires.

The bosses 9 and 10 are shown as being of circular cross section and upwardly tapered; however, said bosses could be of other shapes and various other modifications and changes are contemplated and may be resorted to, without departing from the function or scope of the invention.

I claim as my invention:

1. A tire chain applying device comprising an elongated pad having a plurality of projections fixed to and rising therefrom, said projections being arranged in spaced apart relation to one another and in rows disposed longitudinally and transversely of the pad, said pad being adapted to receive a plurality of cross chains of a tire chain with said cross chains disposed between certain of said transverse rows of projections, said projections being adapted to support a pneumatic tire of a vehicle wheel above and out of engagement with said cross chains to facilitate applying the tire chain to the tire, said projections constituting hollow studs or bosses each defining an impervious chamber opening downwardly through the pad and adapted to form a suction cup for adherence to a slippery surface, or to be packed with a part of the snow of a snow covered surface on which the pad is resting, for anchoring the pad thereto.

2. A device as in claim 1, said means to prevent slippage of the pad additionally including annular embossments formed on the underside of the pad around the open lower ends of said chambers.

3. A device as in claim 1, said studs or bosses constituting tread means to prevent slippage of the tire relative to said device.

* * * * *